United States Patent [19]
Fink

[11] 4,223,045
[45] Sep. 16, 1980

[54] PRESERVATIVE FOR ANIMAL FEEDS

[75] Inventor: Fritz Fink, Limburgerhof, Fed. Rep. of Germany

[73] Assignee: BASF Aktiengesellschaft, Fed. Rep. of Germany

[21] Appl. No.: 6,529

[22] Filed: Jan. 25, 1979

Related U.S. Application Data

[63] Continuation of Ser. No. 833,060, Sep. 14, 1977, abandoned.

[30] Foreign Application Priority Data

Oct. 1, 1976 [DE] Fed. Rep. of Germany ....... 2644351

[51] Int. Cl.$^3$ .......................... A23K 3/00; A23K 3/02
[52] U.S. Cl. ..................................... 426/335; 426/532; 426/623; 426/630; 426/635; 426/807
[58] Field of Search .................. 426/53, 54, 335, 532, 426/630, 635, 654, 807, 623

[56] References Cited

U.S. PATENT DOCUMENTS

| 3,202,514 | 8/1965 | Burgess et al. | 426/532 |
| 3,732,112 | 5/1973 | Frankenfeld et al. | 426/335 |
| 3,899,588 | 8/1975 | Skov et al. | 426/335 |
| 3,982,026 | 9/1976 | Fahnenstieh et al. | 426/54 |

FOREIGN PATENT DOCUMENTS

| 1692505 | 7/1971 | Fed. Rep. of Germany | 426/54 |
| 2355441 | 5/1974 | Fed. Rep. of Germany | 426/54 |

Primary Examiner—R. B. Penland
Attorney, Agent, or Firm—Keil & Witherspoon

[57] ABSTRACT

Preservative for feeds which contains a liquid mixture of ammonium propionate, propylene glycol and water. The molar ratio of ammonium propionate to propylene glycol is from 1:0.1 to 1:0.7. The liquid mixture contains from 20 to 30 weight percent water, 44.2 to 64.6 weight percent ammonium propionate and 5.4 to 29.5 weight percent propylene glycol. Adequate preservation is ensured by the addition of from 0.3 to 3 wt % of the liquid mixture to the feed.

2 Claims, No Drawings

PRESERVATIVE FOR ANIMAL FEEDS

This is a continuation of application Ser. No. 833,060, filed Sept. 14, 1977, now abandoned.

The present invention relates to preservatives for animal feeds based on liquid mixtures of ammonium propionate, propylene glycol and water, and their use.

The employment of propionic acid and salts thereof as a preserving additive to feeds of widely varying kinds is known (German Laid-Open Application DOS No. 2,019,125; British Pat. No. 1,101,342; German Laid-Open Application DOS No. 2,019,972). The effectiveness of these substances is attributable to their biocidal and long-lasting biostatic action (Zbl. Bakt., II, 125, H. 1, 100, 1970).

When pure propionic acid is used as preservative, storage and application are made difficult by the corrosive action and the unpleasant smell of the acid. Because of these disadvantages, salts of the acid, especially the sodium or calcium salt, are used in many cases instead of the pure acid. However, drawbacks here are the higher costs compared with propionic acid and the difficulties which occur when these pulverulent salts are added to granules and liquid media. Both propionic acid and sodium and calcium propionate are oxidatively degraded in the animal metabolism and utilized energetically.

The employment of solutions containing a lower aliphatic carboxylic acid having from 2 to 10 carbon atoms, the ammonium salt of this acid and water for combatting mildew formation on moist seed and for preventing mold formation on silage is known from German Laid-Open Application DOS No. 2,355,441. The solution described therein contain approx. 40 to 50 wt% of water, which means that large volumes have to be applied. This makes handling during transport and storage difficult and expensive, and the nutrient concentration of the feeds is diminished.

The use of propylene glycol as an energy-supplying, physiologically high-grade additive to animal feeds, especially for the prevention of ketosis, is known. For instance, German Printed Application DAS No. 1,692,505 discloses a feed additive consisting of propylene glycol, sodium propionate, sodium bicarbonate and the usual mineral components and trace elements, and which is fed predominantly to high-producing dairy cows for some weeks prior to and for some weeks after calving.

We have now found that a liquid mixture containing ammonium propionate, propylene glycol and water, the molar ratio of ammonium propionate to propylene glycol being from 1:0.1 to 1:0.7, has an excellent preservative action on feeds.

The mixture according to the invention also has the following advantages over prior art preservations. It does not have a corrosive action on steel (unalloyed steel) or aluminum, and is indifferent to polyethylene, polyester resins and polyvinyl chloride. Feeds treated with the mixture according to the invention may (provided that their own organic acid content is normal) be kept in unprotected vessels or storerooms. The pure preservative too may be kept for any length of time in steel vessels without corrosion setting in.

The mixture may also be stored and processed at low temperatures. At temperatures of down to −6.5° C., the solid components do not separate out.

Furthermore, the liquid mixture is extremely simple to prepare and meter. It is almost odorless—even after having been in contact with air for a fairly long period of time, neither ammonia nor acid vapors are given off—and is not caustic to the skin. The nitrogen in the mixture gives it additional nutritional value. Feeds containing it as additive are consumed by the animals much more readily than untreated fodder.

The water content of the mixture according to the invention may vary from 20 to 30 wt%, the molar ratio of ammonium propionate to water being from 1:2.0 to 1:3.5. The liquid mixture contains from 20 to 30 weight percent water, 44.2 to 64.6 weight percent ammonium propionate and 5.4 to 29.5 weight percent propylene glycol.

To prepare the preservative according to the invention, ammonium propionate, propylene glycol and water, or propionic acid, ammonia, propylene glycol and water are mixed. A mixture of $\geq 85$ parts by weight of an approx. 65% strength ammonium propionate solution and $\leq 15$ parts by weight of 100% strength propylene glycol is advantageous; this is equivalent to a molar ratio of ammonium propionate to propylene glycol of approx. 1:0.3, and of ammonium propionate to water of 1:2.7.

The liquid mixture of ammonium propionate and propylene glycol according to the invention is suitable for preserving feedstuffs in amounts of from 0.3 wt% upwards, based on the feedstuff; generally, an addition of up to 3 wt% suffices. Expediently, from 0.4 to 2.0 wt% (in each case, with reference to the feed) is added to green forage of all kinds, from 0.4 to 3.0 wt% to freshly harvested cereal feeds of all kinds (barley, oats, rye, wheat) and Indian corn and legumes for feed purposes, and from 0.3 to 3.0 wt% to mixed feeds and their components (e.g., tapioca, cereal-based products, products of the starch, sugar and oil industries, and animal and vegetable protein products). The requisite applications rate increases as the moisture content of the feeds rises.

The advantageous properties of the preservative according to the invention are illustrated in the following experiments.

EXAMPLE 1

A commercial mixed feed (single formulation pigfeed) was adjusted to a water content of 18 wt% and treated with a mixture of 85 parts by weight of 65% strength aqueous ammonium propionate solution and 15 parts by weight of 100% strength propylene glycol (APP) and, for comparison, with pure propionic acid (PA). The preservative action was assessed visually.

| Experimental period (storage duration) | | 28 days |
|---|---|---|
| Preservative | Appln. rate in wt %, based on feed | Assessment of preservative action |
| — | — | first mold spots visible after 4 days: almost completely spoiled after 10 days |
| PA | 0.3 | feed in faultless condition upon conclusion of experiment |
| APP | 0.4 (equivalent to 0.22 wt % of ammonium propionate) | feed in faultless condition upon conclusion of experiment |

The experiment shows that the mixture according to the invention, even when added in small amounts, has, compared with pure propionic acid, a good preservative action on feeds.

EXAMPLE 2

The action of a mixture of 85 parts by weight of an approx. 65% strength aqueous ammonium propionate solution and 15 parts by weight of propylene glycol (APP) on unalloyed steel was observed over a period of 70 days. 100% strength propionic acid, tap water and cereal containing 20 wt% water were used for comparison purposes.

| Test substance | Rate of linear corrosion in unalloyed steel (mm/year) | | Assessment |
|---|---|---|---|
| | at room temp. | at 40° C. | |
| APP | <0.001 | <0.001 | no corrosion, material fully suitable |
| Propionic acid | 1.77 | 4.11 | considerable corrosion, material unsuitable |
| Tap water | 0.07[+] | 0.17[+] | distinct corresion at high temp. |
| Moist cereal | 0.008[++] | 0.11 | distinct corrosion at high temp. |

[+] pitting
[++] synelinal attack

The table shows that the mixture according to the invention does not, compared with pure propionic acid, have a corrosive action on steel. Tap water and moist cereal also have a stronger corrosive action than the mixture.

EXAMPLE 3

The following calculation demonstrates the amelioration of feeds treated with a mixture of 85 parts by weight of an approx. 65% strength ammonium propionate solution and 15 parts by weight of 100% strength propylene glycol (APP).

| Application rate: 1.5 wt % APP, based on barley | | |
|---|---|---|
| | Content of | |
| | crude protein (g) | starch equivalents |
| 1 kg APP[+] | 531 | 745 |
| 1 kg barley containing 20 wt % moisture | 112 | 650 |
| 1 kg barley after addition of 1.5 wt % APP (= 15 g) | 118 | 651 |

[+] 85 g of N/kg mixture is equivalent to 85 × 6.25 = 531 g of crude protein/kg mixture.

The values show that the crude protein content of the barley is increased by being treated with the mixture according to the invention; the starch equivalent value is hardly influenced at all.

EXAMPLE 4

The appetite of cattle for a mixed feed to which the mixture according to the invention (APP) has been added is compared with that for an untreated mixed feed (control). All the animals are fed 1 kg of mixed feed per day (feeding taking place twice daily).

| | Rate of consumption of mixed feed by cattle in minutes per meal | Increase in rate of consumption |
|---|---|---|
| Control feed | 7.8 | |
| Mixed feed, with addition of 8 wt % APP | 7.0 | 10% |
| Mixed feed, with addition of 10 wt % APP | 6.8 | 12% |

Mixed feeds treated with the mixture according to the invention are consumed distinctly more quickly than untreated feeds.

We claim:

1. A preservative for animal feeds consisting essentially of a liquid mixture of ammonium propionate, propylene glycol and water, having from 20 to 30 weight percent water, from 44.2 to 64.6 weight percent ammonium propionate and from 5.4 to 29.5 weight percent propylene glycol.

2. A process for preserving animal feeds, comprising treating said animal feeds with from 0.3 to 3 percent by weight, based on the weight of the feed, of the liquid mixture of claim 1.

* * * * *